(12) United States Patent
Thiagarajan et al.

(10) Patent No.: US 7,333,990 B1
(45) Date of Patent: Feb. 19, 2008

(54) DYNAMIC REVERSE PROXY

(75) Inventors: Rajesh Thiagarajan, Chennai (IN);
Bing He, Lexington, MA (US);
Thomas Raymond Mueller, Fremont, NE (US)

(73) Assignee: Sun Microsystems, Inc., Santa Clara, CA (US)

( * ) Notice: Subject to any disclaimer, the term of this patent is extended or adjusted under 35 U.S.C. 154(b) by 450 days.

(21) Appl. No.: 10/873,680

(22) Filed: Jun. 22, 2004

(51) Int. Cl.
*G06F 17/30* (2006.01)

(52) U.S. Cl. .................. 707/10; 707/3; 707/104.1; 709/203

(58) Field of Classification Search ............ 707/104.1, 707/2–5, 10; 709/203; 715/749; 719/311; 717/173, 178
See application file for complete search history.

(56) References Cited

U.S. PATENT DOCUMENTS

| | | | |
|---|---|---|---|
| 6,886,013 B1* | 4/2005 | Beranek ................. | 707/10 |
| 7,058,699 B1* | 6/2006 | Chiou et al. ............ | 709/219 |
| 7,099,927 B2* | 8/2006 | Cudd et al. ............. | 709/217 |
| 7,200,644 B1* | 4/2007 | Flanagan ................ | 709/219 |
| 2004/0044768 A1* | 3/2004 | Takahashi .............. | 709/225 |
| 2005/0086306 A1* | 4/2005 | Lemke ................... | 709/206 |
| 2006/0031442 A1* | 2/2006 | Ashley et al. .......... | 709/223 |

* cited by examiner

*Primary Examiner*—Cheryl Lewis
(74) *Attorney, Agent, or Firm*—Osha Liang LLP

(57) ABSTRACT

A system including a browser configured to generate a request to access a content server, a dynamic proxy dynamically downloaded onto the browser, and a plurality of proxy settings located on the browser and configured to be modified by the dynamic proxy, wherein the proxy settings are modified to redirect the request to the dynamic proxy.

14 Claims, 3 Drawing Sheets

DYNAMIC REVERSE PROXY

BACKGROUND

Reverse proxy is a mechanism used to represent one or more secure content servers (i.e., a web servers) to outside clients, preventing direct, unmonitored access to data within the content servers from outside. Typically, the content servers are located behind a firewall and are part of a secure internal network. Reverse proxy may be used outside the firewall to represent the secure content servers to external clients.

For example, if a content server containing sensitive information, such as a database of credit card numbers, must remain secure, then a proxy server in reverse proxy mode may be set up outside of the firewall protecting the content server. In this case, the proxy server appears as the content server to the client requesting information from the actual content server. Conventionally, when a client makes a request to the content server, the request is directed to the proxy server. The proxy server then sends the client's request through a specific passage in the firewall to the content server. Subsequently, the content server passes the result through the passage back to the proxy. At this stage, the proxy modifies the request headers and sends the retrieved information to the client, as if the proxy were the actual content server. Further, if the content server returns an error message, the proxy server can intercept the message and change any uniform resource locators (URLs) listed in the headers before sending the message to the client. This prevents external clients from receiving redirection URLs to the internal content server.

Reverse proxies are typically set up using one of following two basic architectures. The first architecture employs a one-to-one mapping between the internal network IP addresses and some external network attribute. For example, a one-to-one mapping may be set up between the IP address of the content server and externally published port numbers. Alternate implementations may map internal IP addresses to external IP addresses, URL paths, etc. In some instances, the aforementioned method for reverse proxying requires manual intervention when a server is added to the internal network.

An alternate architecture used for reverse proxy involves a URL rewriter. The URL rewriter includes the functionality to intercept, identify, and replace each URL of the page (i.e., information requested) served to the client. The original URL is rewritten such that the any subsequent request from the client is returned back to the proxy server rather than to the internal network. Typically, the URL rewriter is self-learning, i.e., the URL rewriter is capable of learning new internal network URLs without manual intervention.

SUMMARY

In general, in one aspect, the invention relates to a system comprising a browser configured to generate a request to access a content server, a dynamic proxy dynamically downloaded onto the browser, and a plurality of proxy settings located on the browser and configured to be modified by the dynamic proxy, wherein the proxy settings are modified to redirect the request to the dynamic proxy.

In general, in one aspect, the invention relates to a method for reverse proxying comprising downloading a dynamic proxy onto a browser, modifying proxy settings associated with the browser to redirect a request to the dynamic proxy, obtaining routing information using the dynamic proxy, routing the request to a reverse proxy server based on routing information and sending the request to a content server residing within an internal network using the reverse proxy server if the request is for a content server.

In general, in one aspect, the invention relates to a computer system for reverse proxying comprising a processor, a memory, a storage device, and software instructions stored in the memory for enabling the computer system under control of the processor, to download a dynamic proxy onto a browser, modify proxy settings associated with the browser to redirect a request to the dynamic proxy, obtain routing information using the dynamic proxy, route the request to a reverse proxy server based on routing information and send the request to a content server residing within an internal network using the reverse proxy server, if the request is for a content server.

Other aspects of the invention will be apparent from the following description and the appended claims.

DETAILED DESCRIPTION

Figure 1:
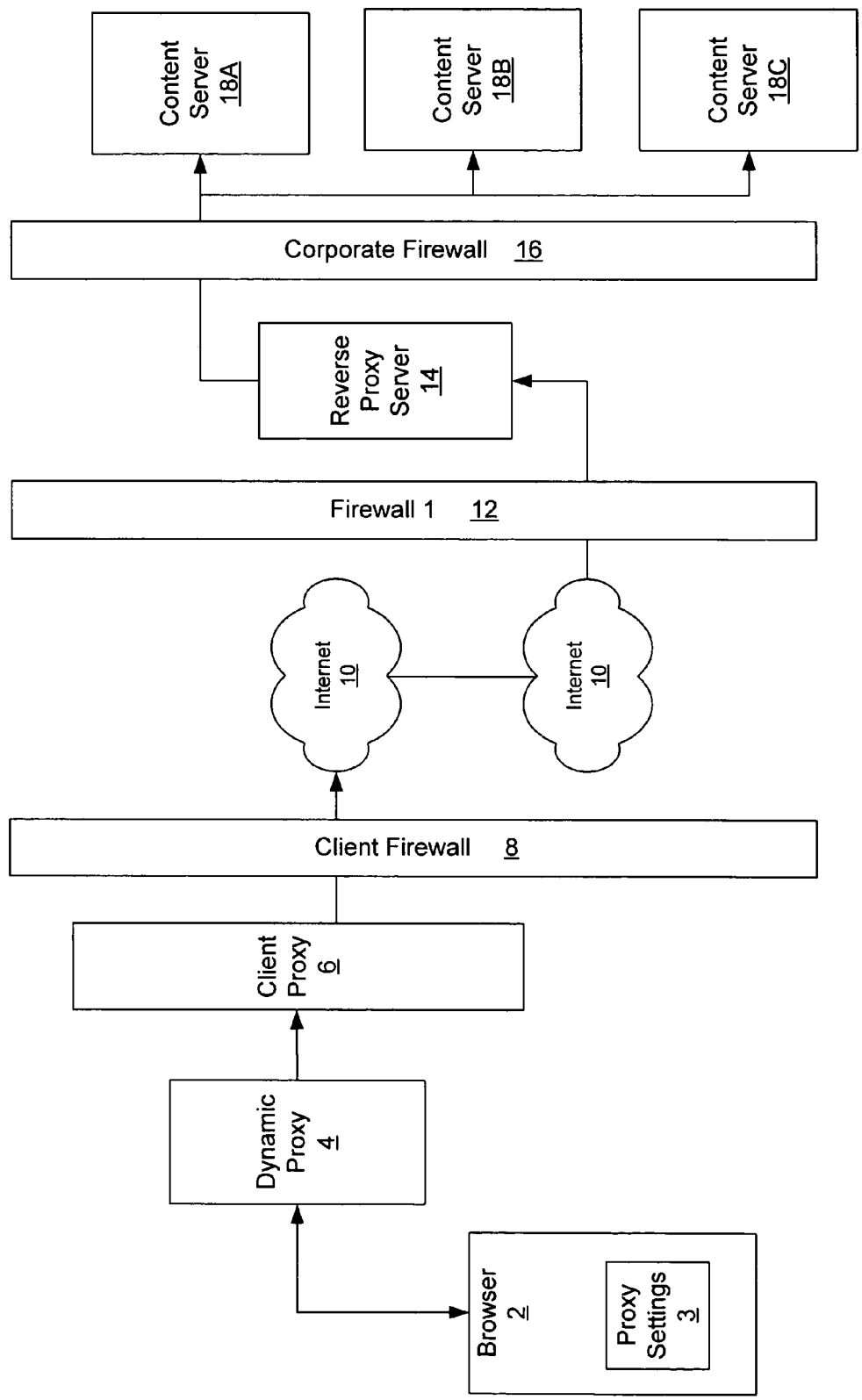
FIG. 1 shows a dynamic reverse proxy system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows a dynamic reverse proxy system in accordance with one embodiment of the invention. The dynamic reverse proxy system may include a browser (2) (i.e., web browser) including proxy settings (3), a dynamic proxy (4), a client proxy (6), a reverse proxy server (14), and several content servers (18A, 18B, 18C) within an internal network that is protected by a corporate firewall (16). The browser (2) on a client typically has its own client proxy (6) and client firewall (8) through which requests from the client are routed, via the Internet (10), to any destination server. Conventionally, the browser (2) proxy settings (3) point to the client proxy (6) so that requests originating from the browser (2) are routed through the client proxy (6). Specifically, the client proxy (6) intercepts requests from client applications in order to cache these requests for greater network efficiency and increased response time for clients. The intercepted requests are forwarded to appropriate destination servers by the client proxy (6) through the client firewall (8) over the Internet (10). In this manner, the client proxy (6) hides the client's IP address (i.e., protects the client machine) from the other machines used by the client to access content from the Internet (10). Additionally, in one embodiment of the invention, the client proxy (6) acts as a policy enforcement point where an administrator my allow or deny particular URLs, web sites, domain names, etc.

As noted above, the dynamic proxy system of FIG. 1 includes a dynamic proxy (4). The dynamic proxy (4) is a client-side dynamic proxy that routes requests via the client proxy (6) and the client firewall (8) to the reverse proxy server (14). More specifically, the dynamic proxy (4) is mobile code that includes functionality to work with the client's own proxy and client firewall (8) to direct all requests generated by the browser (2) back to the dynamic proxy (4). In one embodiment of the invention, the dynamic proxy (4) is dynamically downloaded onto the client's browser (2) from a destination server. In one embodiment of the invention, the dynamic proxy may be an applet that is dynamically downloaded on to the browser (2).

Once the dynamic proxy (4) is downloaded, the dynamic proxy (4) modifies the proxy settings (3) of the browser (2). The proxy settings (3) are modified so that the browser's proxy settings point to the downloaded dynamic proxy (4) rather than the client proxy (6). In this manner, all traffic associated with the browser (2) is directed to the dynamic proxy (4). In one embodiment of the invention, the dynamic proxy (4) modifies the proxy settings (3) of the browser (2) by reading a proxy auto configuration (PAC) file associated with the proxy settings (3). The PAC file specifies multiple specialized client proxies (or no proxy at all) for various types of URLs and various servers. For example, the PAC file may specify that a specific proxy serves the .com domain, another proxy serves the .edu domain, etc. By reading the PAC file, the dynamic proxy is capable of routing requests based on the various reverse proxy servers specified in the PAC file. In one embodiment of the invention, if a particular browser configures proxy settings in a different manner (e.g., manual proxy, direct connection), then the dynamic proxy is also capable of reconfiguring these types of proxy settings. For example, a particular browser may support manual proxy, in which only one client proxy exists per protocol. In addition, a particular browser may employ direction connection, in which no client proxy is specified.

One skilled in the art will appreciate that the dynamic proxy is capable reconfiguring proxy settings on several different types of browsers (i.e., Internet Explorer, Netscape, etc.). Further, the dynamic proxy is capable of handling traffic in several protocols such as HyperText Transfer Protocol (HTTP), HyperText Transfer Protocol (Secure) (HTTPS), File Transfer Protocol (FTP), etc. In one embodiment of the invention, when the dynamic proxy (4) is unloaded from the browser (2), the browser's original proxy settings (3) are restored.

Continuing with FIG. 1, the reverse proxy sever (14) is used to route requests to the internal network via a specific path through the corporate firewall (16). The dynamic proxy (4) routes requests to the reverse proxy server via the client firewall (8), the client proxy (6), and Firewall 1 (12). In one embodiment of the invention, the reverse proxy server (14) includes functionality to send the client's request (received from the dynamic proxy (4)) to one or more content servers (18A, 18B, 18C) and receive a response from the content server(s) (18A, 18B, 18C), which is then forwarded back to the dynamic proxy (4). The content server(s) (18A, 18B, 18C) are the servers which contain sensitive information (e.g., credit card database) and reside in the internal network protected by a corporate firewall (16). Additionally, the IP address of the content server(s) (18A, 18B, 18C) is not published on the public domain name system (DNS). Therefore, clients are not capable of accessing the content server(s) (18A, 18B, 18C) directly. By receiving information from content servers (18A, 18B, 18C) and forwarding this information to the client, the reverse proxy server (14) acts as the actual content server(s) (18A, 18B, 18C).

One skilled in the art will appreciate that the reverse proxy server (14) may be used by multiple clients accessing the content server(s) (18A, 18B, 18C). Additionally, one skilled in the art will appreciate that the dynamic proxy (4) may route the request to a gateway (i.e., instead of a reverse proxy server (14)), which is a system on the edge of the internal network protected by the corporate firewall (16).

In one embodiment of the invention, the corporate firewall (16) is configured to only allow specific types of access (i.e., HTTP, HTTPS, FTP, etc.) from the reverse proxy server (14) to the content server(s) (18A, 18B, 18C). This configuration ensures that requests coming from the reverse proxy server (14) are valid requests. One skilled in the art will appreciate that there may be several reverse proxy servers to which the dynamic proxy routes requests.

In one embodiment of the invention, the dynamic proxy (4) includes functionality to encrypt traffic between the dynamic proxy (4) and the reverse proxy server (14). For example, in one embodiment of the invention, the dynamic proxy (4) may include a custom Secure Sockets Layer (SSL), allowing the dynamic proxy (4) to use SSL to encrypt traffic. Typically, an SSL session exists between the browser (2) and the reverse proxy server (14), provided that the reverse proxy server (14) is running (i.e., deployed) over SSL. This original SSL session is used to initially download the dynamic proxy (4). Once the dynamic proxy (4) downloads onto the browser (2), the dynamic proxy (4) may make a connection back to the reverse proxy server (14) using the custom SSL within itself. Using dynamic reverse proxy, the possibility to provide SSL between the dynamic proxy (4) and the reverse proxy server (14) exists, even if the content server(s) (18A, 18B, 18C) is not running over SSL. This allows the dynamic proxy (4) to provide encrypted access to the content server(s) (18A, 18B, 18C). One skilled in the art will appreciate that the aforementioned custom SSL session does not require the content server(s) to be deployed using a specific protocol. Rather, the content server(s) may be deployed using any protocol an administrator chooses.

In one embodiment of the invention, in addition to protecting the content server(s) (18A, 18B, 18C), the reverse proxy server (14) is used as an application layer (i.e., SSL) virtual private network (VPN). By using the reverse proxy server (14) as an SSL VPN, the reverse proxy server (14) provides another layer of protection for internal resources within the content server(s). In this manner, the reverse proxy server (14) may be configured to run in secure mode with SSL enabled, while the content server(s) (18A, 18B, 18C) are not running SSL. Therefore, dynamic reverse proxy may be used to allow the reverse proxy server (14) to act as the VPN gateway (i.e., an edge system that allows clients to connect from any remote system on the Internet to gain access to content server(s)).

Figure 2:
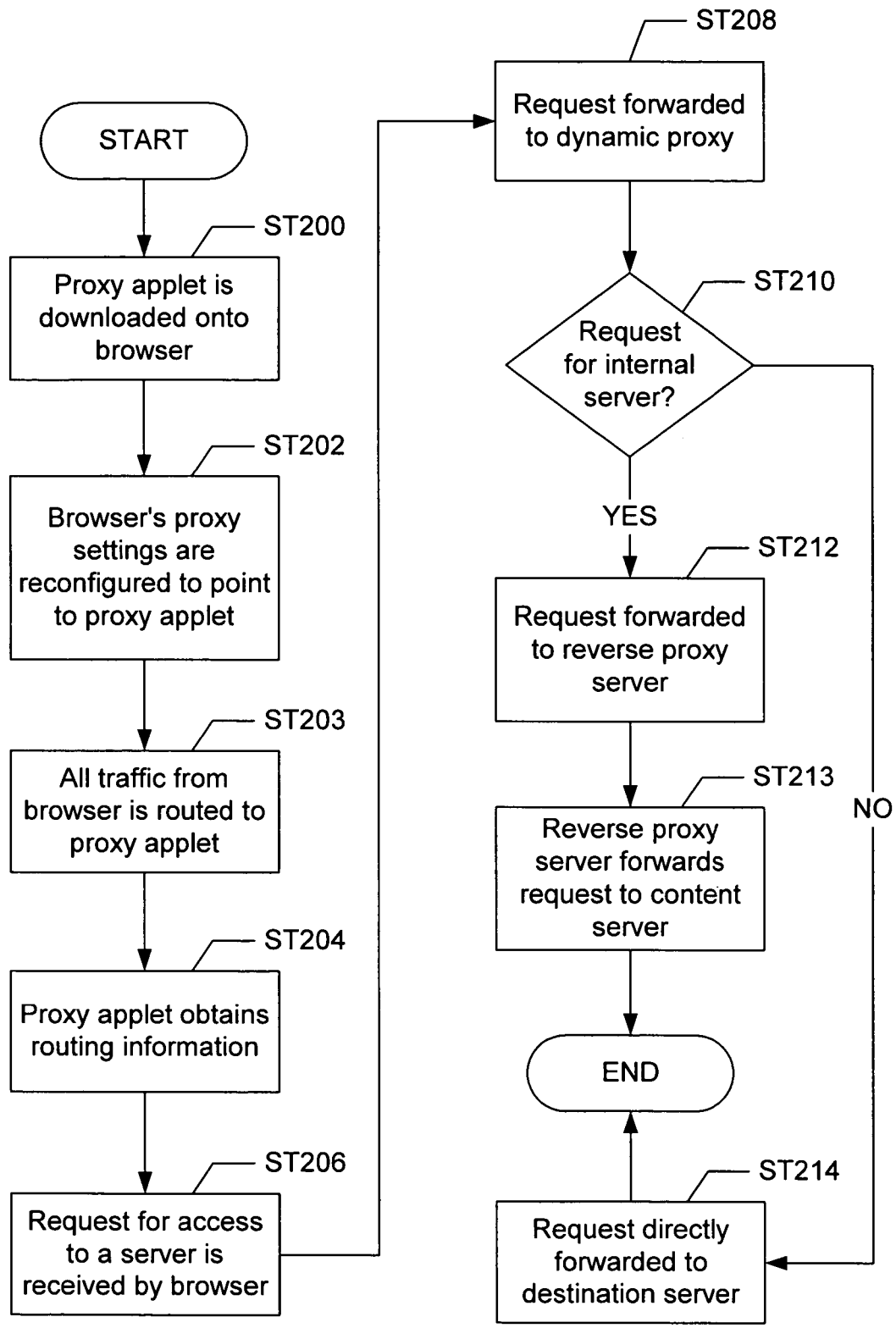
FIG. 2 shows a flow chart for using dynamic reverse proxy in accordance with an embodiment of the invention.

FIG. 2 shows a flow chart for using dynamic reverse proxy in accordance with one embodiment of the invention. Initially, the dynamic proxy is dynamically downloaded onto a client's browser (Step 200). This process is initiated when the client (i.e., a user) types the uniform resource locator (URL) of the reverse proxy server (14) into the browser (2). Because the reverse proxy server (14) is the only entry point into the internal network (i.e., the network protected by the corporate firewall (16)) the user must initially point the browser (2) to the URL of the reverse proxy server (14). In response to this initial request made by the client, the user is redirected to a HyperText Mark-up Language (HTML) page which automatically downloads the dynamic proxy (4) onto the user's browser (2). Subsequently, the dynamic proxy reconfigures the browser's proxy settings so that the new configuration allows the proxy settings to point to the downloaded dynamic proxy (Step 202). In one embodiment of the invention, this may be done by reading the PAC file associated with the browser proxy settings. This allows all traffic (i.e., requests, responses, data from internal network, etc.) to be directed to the downloaded dynamic proxy (Step 203).

Once the dynamic proxy has reconfigured the proxy settings, the dynamic proxy obtains routing information (Step 204). Routing information allows the dynamic proxy to route requests to appropriate reverse proxy servers. In one embodiment of the invention, routing information is gathered from multiple sources. For example, the dynamic proxy uses the proxy information that the browser initially contained (i.e., before the browser proxy settings are reconfigured by the dynamic proxy). Additionally, the dynamic proxy gathers routing information using the destination server from which the dynamic proxy is downloaded. Further, the dynamic proxy uses the domain names of the internal network for which the dynamic proxy provides reverse proxying. The configuration details and routing information obtained from the aforementioned sources allows the dynamic proxy to route all the requests on behalf of the browser to the appropriate content server(s).

At this stage, all network traffic is routed to the dynamic proxy, and the dynamic proxy is capable of providing the reverse proxy service. When the client's browser receives a request to access a content server (e.g., a web server) (Step 206), the request is forwarded to the dynamic proxy (Step 208). Subsequently, a determination is made as to whether the request from the browser is for a content server (i.e., a server protected by a corporate firewall and residing in an internal network) (Step 210). If the request is for a content server, then the dynamic proxy routes the request via a specific path through the client proxy and to the reverse proxy server (Step 212). The reverse proxy server then forwards the request to the content server (Step 213).

One skilled in the art will appreciate that the reverse proxy functionality may be provided using several different methods. For example, a reverse proxy may be a load balancer that chooses content server(s) to send client requests based on some load balancing algorithm. Alternatively, reverse proxy may be an intelligent server which determines which content server(s) to acquire requested information from or a URL rewriter based content translator in which all URLs (associated with content servers) are rewritten to point to itself. In one embodiment of the invention, reverse proxy may be a request forwarder based on a port, IP or network attribute. In this case, content server(s) may be specified by a particular port, IP, or network attribute.

Continuing with FIG. 2, once the reverse proxy server forwards the request to the content server, the content server provides the requested information back to the reverse proxy server. At this stage, the reverse proxy server may forward the requested information to the dynamic proxy, which in turn forwards the requested information to the client (i.e., the user). In contrast, if the request is not for a content server, then the dynamic proxy forwards the request directly to a destination server (Step 214). The destination server may be any server that is not protected by a corporate firewall.

One skilled in the art will appreciate that the dynamic proxy may route the request using any application routing protocol and is not limited to standard routing protocols or only protocols supported by the browser. For example, if a particular browser supports only HTTP routing, the dynamic proxy may use a different routing protocol (i.e., HTTPS, FTP, etc.) to route a request to an appropriate reverse proxy server.

Figure 3:
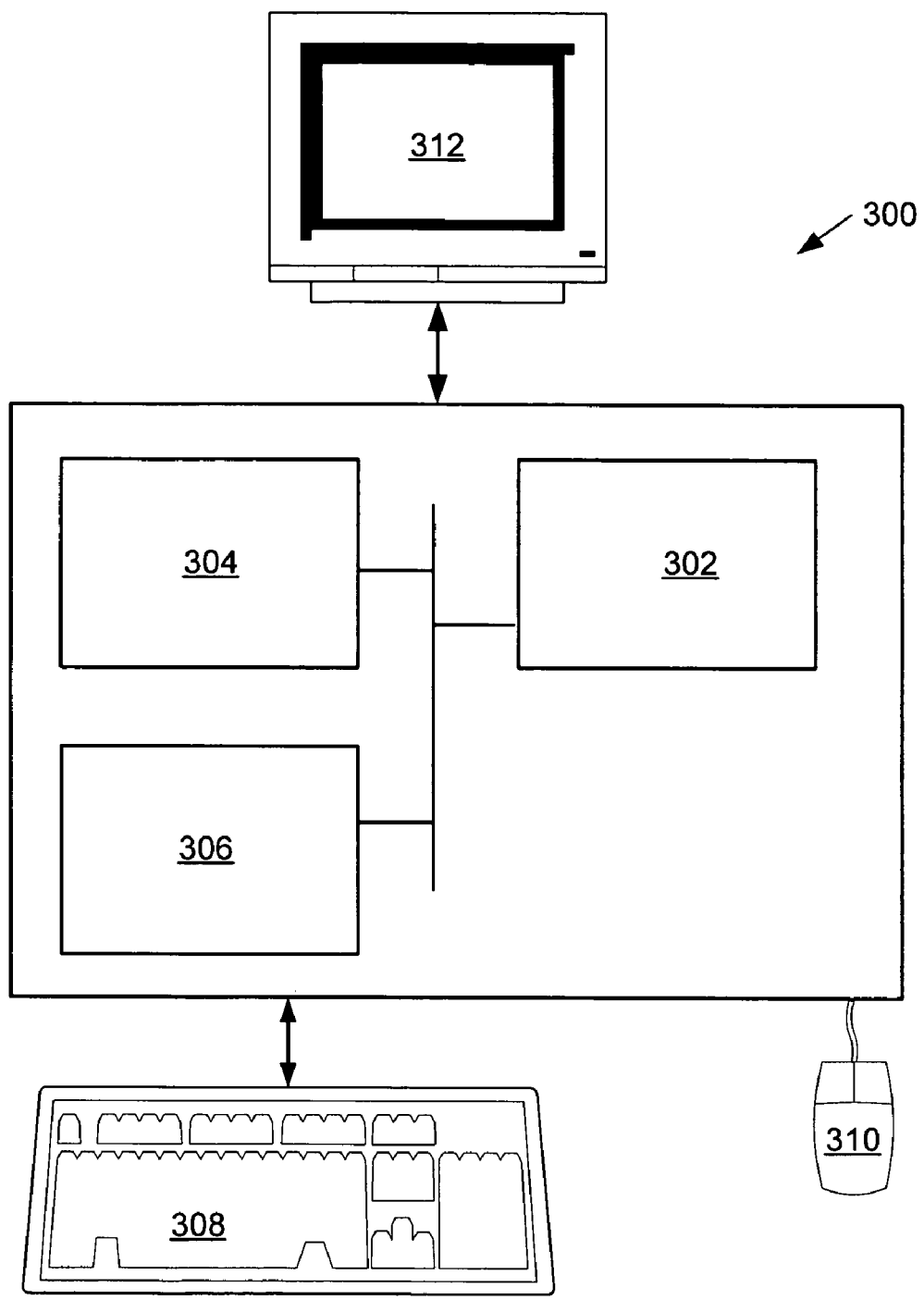
FIG. 3 shows a computer system in accordance with an embodiment of the invention.

An embodiment of the invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be located at a remote location and connected to the other elements over a network.

Embodiments of the invention provide a method to deny direct access to content servers that are protected by a corporate firewall and may contain sensitive information by providing access to the content servers using dynamic reverse proxy. Further, dynamic reverse proxy is provided using a dynamic proxy, which is automatically downloaded onto a user's browser without manual configuration. The dynamic proxy is capable of reconfiguring the browser proxy settings such that all requests are received by the dynamic proxy. In this manner, the dynamic proxy routes all traffic to a reverse proxy server. Additionally, the dynamic proxy allows the user to browse the content server in the intranet without actually exposing the content server's IP address onto the Internet. Further, the dynamic proxy is capable of providing data integrity using encryption.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a processor configured to execute a browser;
   the browser configured to generate a request to access a content server;
   a dynamic proxy dynamically downloaded onto the browser; and
   a plurality of proxy settings located on the browser and configured to be modified by the dynamic proxy; and
   a reverse proxy server configured to receive the request for the content server from the dynamic proxy, wherein the request is routed to the reverse proxy server using routing information, wherein the routing information comprises browser proxy settings, a destination server from which the dynamic proxy was downloaded and domain names for an internal network for which the dynamic proxy provides reverse proxying; and
   wherein the proxy settings are modified to redirect the request to dynamic proxy.

2. The system of claim 1, wherein the content server resides within the internal network.

3. The system of claim 1, wherein the reverse proxy server is further configured to route the request to the content server.

4. The system of claim 1, wherein the dynamic proxy routes the request to the reverse proxy server using a routing protocol not supported by the browser.

5. The system of claim 1, wherein the dynamic proxy redirects requests to the reverse proxy server via a client proxy and a client firewall.

6. A method for reverse proxying comprising:
   downloading a dynamic proxy onto a browser wherein the browser is executing on a processor;
   modifying proxy settings associated with the browser to redirect a request to the dynamic proxy;
   obtaining routing information using the dynamic proxy;
   routing the request to a reverse proxy server based on routing information, wherein routing information comprises browser proxy settings, a destination server from which the dynamic proxy was downloaded, and domain names for an internal network for which the dynamic proxy provides reverse proxying;
   sending the request to a content server residing within an internal network using the reverse proxy server if the request is for a content server; and
   restoring the proxy settings associated with the browser when the dynamic proxy is unloaded from the browser.

7. The method of claim 6, further comprising:
   forwarding the request to a destination server using the dynamic proxy if the request is not for the content server.

8. The method of claim 6, wherein the request is routed to the content server through a corporate firewall.

9. The method of claim 6, wherein the dynamic proxy routes the request to the reverse proxy server using a routing protocol not supported by the browser.

10. The method of claim 6, wherein the dynamic proxy redirects requests the reverse proxy server via a client proxy and a client firewall.

11. A computer system for reverse proxying comprising:
    a processor;
    a memory;
    and
    software instructions stored in the memory for enabling the computer system under control of the processor, to:
       download a dynamic proxy onto a browser;
       modify proxy settings associated with the browser to redirect a request to the dynamic proxy;
       obtain routing information using the dynamic proxy;
       route the request to a reverse proxy server based on routing information, wherein routing information comprises browser proxy settings, a destination server from which the dynamic proxy was downloaded, and domain names for an internal network for which the dynamic proxy provides reverse proxying, and
       send the request to a content server residing within an internal network using the reverse proxy server, if the request is for a content server,
    wherein the request is routed to the content server through a corporate firewall.

12. The computer system of claim 11, further comprising:
    software instructions stored in the memory for enabling the computer system under control of the processor, to forward the request to a destination server if the request is not for the content server.

13. The computer system of claim 11, further comprising:
    software instructions stored in the memory for enabling the computer system under control of the processor, to restore the proxy settings associated with the browser when the dynamic proxy is unloaded from the browser.

14. The computer system of claim 11, wherein the dynamic proxy routes the request to the reverse proxy server using a routing protocol not supported by the browser.

\* \* \* \* \*